United States Patent [19]
Green, III et al.

[11] Patent Number: 6,032,238
[45] Date of Patent: Feb. 29, 2000

[54] OVERLAPPED DMA LINE TRANSFERS

[75] Inventors: Edward Hammond Green, III; Richard Gerard Hofmann; Mark Michael Schaffer, all of Cary; Dennis Charles Wilkerson, Durham, all of N.C.

[73] Assignee: Interantional Business Machines Corporation, Armonk, N.Y.

[21] Appl. No.: 09/020,123

[22] Filed: Feb. 6, 1998

[51] Int. Cl.$^7$ ...................................................... G06F 12/00
[52] U.S. Cl. ........................ 711/170; 711/167; 711/169; 711/150
[58] Field of Search ..................................... 711/150, 167, 711/169, 170, 168, 157

[56] References Cited

U.S. PATENT DOCUMENTS

| | | | |
|---|---|---|---|
| 4,803,618 | 2/1989 | Ita et al. | 364/200 |
| 4,890,226 | 12/1989 | Itoh | 364/200 |
| 5,003,465 | 3/1991 | Chisholm et al. | 364/200 |

FOREIGN PATENT DOCUMENTS

| | | | | |
|---|---|---|---|---|
| 245281 | 4/1987 | Germany | | G06F 3/153 |
| 134748 | 6/1987 | Japan | | G06F 13/28 |
| 357055 | 3/1991 | Japan | | G06F 13/28 |
| 375957 | 3/1991 | Japan | | G06F 13/28 |
| 5334234 | 12/1993 | Japan | | G06F 13/28 |
| 7281992 | 10/1995 | Japan | | G06F 13/28 |

*Primary Examiner*—John W. Cabeca
*Assistant Examiner*—Fred F. Tzeng
*Attorney, Agent, or Firm*—John D. Flynn; Robert V. Wilder

[57] ABSTRACT

A method and apparatus is provided which allows overlapping of DMA line read and line write cycles. In an exemplary embodiment, the PLB Line Read Word Address bus is used with a DMA controller sideband signal to detect the conditions required to allow the DMA controller to start the line write one cycle prior to the completion of the line read cycle. A reference bit is set when the first word of a multi-word line transfer has been read. A sideband timing signal is generated one cycle prior to the completion of the read cycle indicating that there is only one read data phase remaining of the line read. If the first word to be written out to memory has been read or is available when the timing signal is generated, the write operation is begun prior to the final phase of the memory read transfer, and the read and write operations are overlapped thereby accomplishing an overlapped read/write transfer in fewer cycles than the sum of read and write transfer cycles if done sequentially.

12 Claims, 3 Drawing Sheets

OVERLAPPED DMA LINE TRANSFERS

RELATED APPLICATIONS

The present application is related to co-pending applications entitled "METHODS AND ARCHITECTURES FOR OVERLAPPED READ AND WRITE OPERATIONS", Attorney Docket RA9-96-066, filed on Oct. 3, 1996, and "SLAVE BUS CONTROLLER POSTED DMA TRANSFERS", filed on, both of which are assigned to the assignee of the present application and included herein by reference.

FIELD OF THE INVENTION

The present invention relates generally to information processing systems and more particularly to an improved device and methodology for processing data transfers in a computer system.

BACKGROUND OF THE INVENTION

Computer systems have historically included at least one main electronics enclosure which is arranged to have mounted therein a plurality of circuit boards. The circuit boards, in turn, typically include a large number of integrated circuits (ICs) or so called "chips". With continuing advances in circuit integration and miniaturization, more and more of the individual chips are being integrated into fewer "full function" chips which include more functionality in less space.

As chip densities continue to increase, more of the computer system functions such as audio, video, and graphics, which have heretofore been normally coupled to a processor at the card level, are now being integrated onto the same IC as the system processor. With this increase in the number of functions being combined in a single IC, the bandwidth requirements of on-chip busses have also increased. As a result, several "on-chip" bus architectures are being developed to address the on-chip communication of processor cores and peripherals.

Most of the on-chip architectures have used the same bus architecture techniques that have been used for off-chip busses. For example, a single data bus is normally used for both read and write operations. Master and slave devices attached to the bus share the common read/write data bus. That technique is the most widely used architecture due to the limited I/O that are available at the chip boundary of the bus masters and slaves. Several bus architectures even share one common bus for the address transfer as well as read and write data transfers. That methodology requires that the address transfer phase be performed prior to the data transfer phase, which, in turn, reduces the bandwidth of the bus.

An on-chip bus is not limited by the number of I/O that an interface may contain. Many of the off-chip architectures have been optimized to reduce the number of I/O pins due to package constraints and degrade the performance of the bus as a result. On-chip busses may have many more interface signals without the associated cost of high pin count packages. Separate address, read data and write data busses are also feasible since the penalty for additional I/O is reduced. As a result, new bus architectures are being developed which take advantage of separate read and write data busses. An implementation of such an architecture is the so-called Processor Local Bus or PLB architecture which is fully set forth and explained in the above referenced co-pending patent application entitled "METHODS AND ARCHITECTURES FOR OVERLAPPED READ AND WRITE OPERATIONS", which has been included herein by reference. The PLB design contains a processor, a DMA controller, an on-chip peripheral bus (OPB) bridge, and an external bus interface unit (EBIU).

In the design of an embedded processor, an on-chip bus architecture is required to provide high bandwidth for the processor and for the Direct Memory Access (DMA) controller to access memory as well as internal and external DMA peripherals. The interface to the processor and DMA were designed with a separate address bus, read data bus, write data bus as well as additional handshaking sideband signals.

The architecture allows simultaneous use of the read and write data busses by one or more PLB bus masters. In the case of the DMA performing PLB line transfers, the DMA read 16 contiguous bytes of data into its internal line buffer and then wrote out the line with a PLB line write operation.

This type of operation did not take advantage of the read and write cycle overlapping available in the PLB bus architecture. The DMA could not overlap the read and write cycles because it could not start the write transfer until the last read cycle had occurred. If the DMA did start the line write prior to receiving the last word in the line, the line write operation could potentially be completed before the last word of data was read into the DMA line buffer. Also, the last word of the read could be the first word required for the write. Either case would cause data corruption.

Accordingly, there is a need for an enhanced method and processing apparatus which is effective to allow for the overlapping of DMA line read and line write cycles without incurring any risk of data corruption.

SUMMARY OF THE INVENTION

A method and apparatus is provided which allows overlapping of DMA line read and line write cycles. In an exemplary embodiment, a DMA controller initiates a line write one cycle prior to the completion of a line read cycle. A reference bit is set when the first word of a multi-word line transfer has been read. A sideband timing signal is generated one cycle prior to the completion of the read cycle indicating that there is only one data transfer phase remaining of the line read. If the first word to be written out to memory has been read or is available when the timing signal is generated, the write operation is begun prior to the final phase of the memory read transfer, and the read and write operations are overlapped thereby accomplishing an overlapped read/write transfer in fewer cycles than the sum of read and write transfer cycles if done sequentially.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
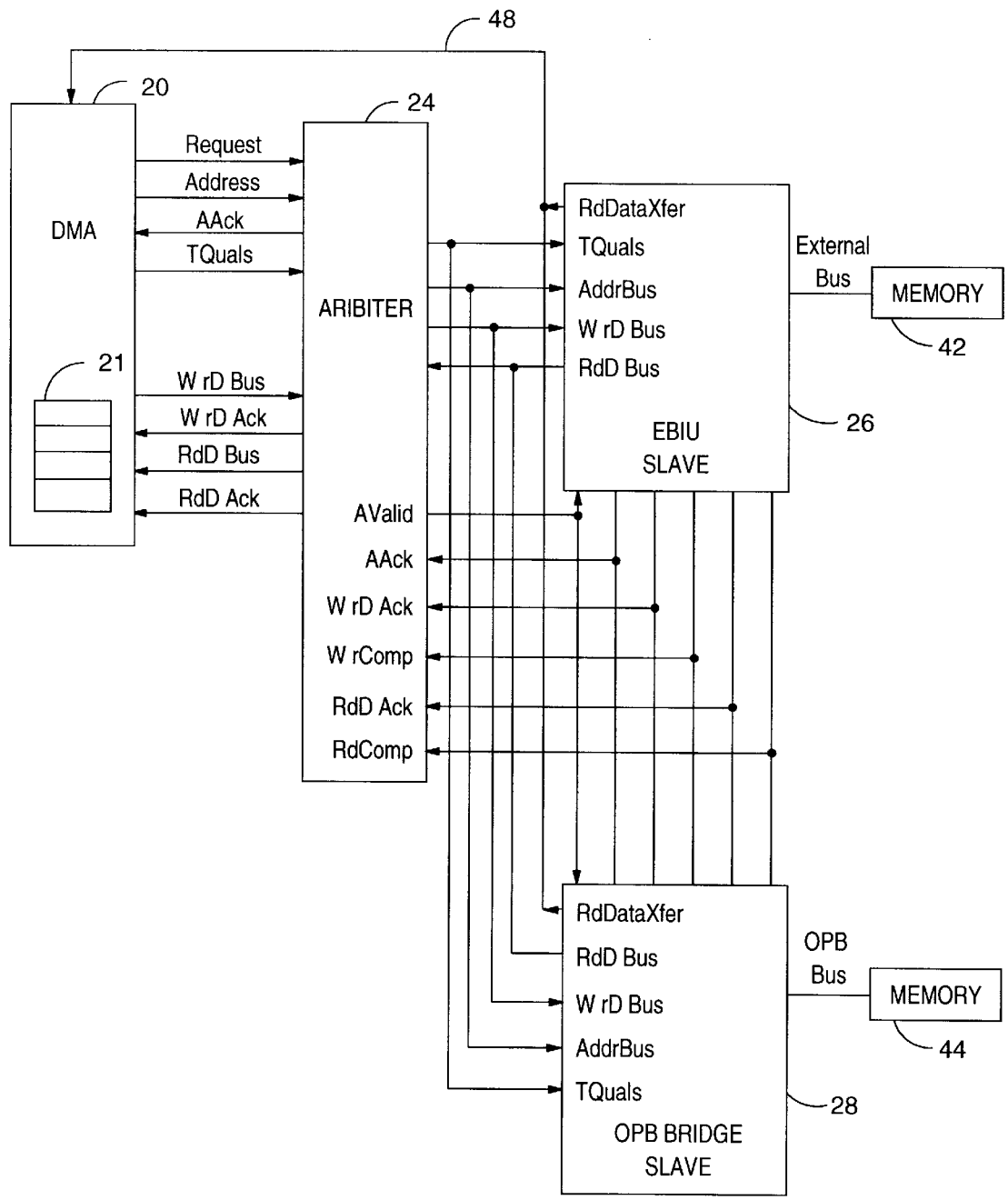
FIG. 1 is a simplified block diagram illustrating the configuration of an exemplary processor local bus or PLB architecture including the PLB DMA Controller and related devices.

FIG. 1 shows a simplified schematic diagram of a PLB system in which an exemplary embodiment of the present invention may be implemented. The illustration shows the major components of an exemplary system sufficient to enable a thorough understanding of the present invention, and non-material circuit details have been omitted in order not to obfuscate the presentation and understanding of the concepts herein presented. Although the present example describes a bus architecture as it relates to PLB overlapped DMA line transfers, it is noted that the present invention applies to other systems as well.

In FIG. 1, there is shown a DMA controller device 20 connected to a PLB bus arbiter unit 24. The DMA controller includes a buffer 21 which is designed to store four 32-bit words, i.e. one "block" or "line" of data, in the present example. An External Bus Interface Unit (EBIU) slave device 26 is connected to the arbiter 24. An On Chip Peripheral Bus (OPB) bridge slave device 28 is also connected to the arbiter 24. The transfer qualifier signals TQuals, which are received by the EBIU slave device 26 and the OPB slave device 28 from the arbiter 24, contain information concerning whether a transfer for which an address is present on the bus is a read or a write transfer, the size of the transfer, the type of the transfer, byte or burst, byte enables for the transfer, the priority or order for the transfer, memory access information or other information about a particular transfer. Because the transfer qualifier information is provided to the slave devices 26 and 28, multiple cycle transfers may be initiated with a single address. For example, by providing an initial address to a slave device and providing the type of transfer and the number of bytes to be transferred, a block of data may be transferred to or from the slave devices over multiple cycles on the data buses with only a single memory access and a single address placed on the address bus. Line transfers comprising a four word line are used in the present example though the methodology herein disclosed may be applied to other architectures.

The slave bus controller devices 26 and 28 are also coupled to the arbiter 24 by a series of signal lines for communicating various control signals including AValid (address valid), AAck (address acknowledge), WrDAck (write data acknowledge), WrComp (write complete), RdDAck (read data acknowledge), RdComp (read complete), RdWdAddr (read word address) and RdDataXfer (read data transfer).

The DMA controller 20 and the arbiter 24 are connected by a series of signal lines for communicating various control signals including Request, Address, AAck (address acknowledge), TQuals (transfer qualifiers), WrDBus (write data bus), WrDAck (write data acknowledge), RdDBus (read data bus) and RdDAck (read data acknowledge).

The EBIU slave device 26 is connected through an external bus to a memory unit 42. The OPB Bridge slave device 28 is connected through an on-chip peripheral bus (OPB Bus) in the present example, which is connected to a memory unit 44. A sideband signal line 48 is also connected between the DMA controller 20 to both the EBIU slave device 26 and the OPB bridge slave device 28, via a two input logical OR function (not shown), for communicating a read data transfer (RdDataXfer) signal to the DMA controller 20.

The following signal names and functions are used in explaining typical operational sequences in the described exemplary embodiment of the present invention.

A Request (DMA PLB Bus Request) signal is asserted by the DMA to request a data transfer across the PLB Bus. When the Request signal is asserted, all of the DMA's transfer qualifiers are valid.

Rd/Wr (DMA read/not write) indicates whether the DMA is performing a PLB read cycle or a PLB write cycle.

An Address (Address Bus) signal represents a 32-bit DMA memory address. The PLB slave must latch this address at the end of the cycle in which it asserts an AAck signal.

An address acknowledge signal "AAck" indicates that the slave has acknowledged the address and will latch the address and all of the transfer qualifiers at the end of the current cycle.

Transfer qualifiers or "TQuals" are signals driven by the DMA and are valid at any time that the Request signal is active. The TQuals signals are used to indicate to the bus slave device various characteristics or qualifications of the transfer such as the size of the transfer and the type of the transfer.

The AValid (Address Valid) signal is asserted by the PLB arbiter to indicate to the slaves that there is a valid address and transfer qualifiers on the Bus. All bus slaves sample this signal and if the address is within a slave's address range and the particular slave is capable of performing the transfer, the slave responds by asserting its AAck signal.

The WrDBus (Write Data Bus) is a 32-bit data bus in the present example, which is used to transfer data during write operations from the DMA controllers to the Bus Slaves.

The WrDAck (Write Data Acknowledge) signal is driven by bus slaves and is used for all write operations to indicate to the master that the data will be latched at the end of the current cycle.

The WrComp (Data Write Complete) signal is asserted by a slave device to indicate to the bus arbiter that a write transfer is complete and that all of the data has been latched by the slave device. The bus arbiter will use this signal to allow the next master's write request to be granted in the following cycle and thus assert the AValid signal and gate that master's write data on to the Write Data Bus.

The RdDBus is a 32-bit data bus which is used to transfer data during read operations from the Bus Slaves to the Bus Masters.

The RdWdAddr (Read Word Address) bus is a four bit bus which indicates the word address within the line of the data word which is currently on the PLB. It tells the master the order in which data words in the requested line transfer are being delivered. The slave can deliver the words in the line in any order.

The RdDAck (Read Data Acknowledge) signal is driven by bus slaves and is used for all read operations to indicate to the master that the data is valid on the Read Data Bus and must be latched at the end of the current cycle.

The RdComp (Data Read Complete) signal is driven by bus slaves and is used to indicate to the bus arbiter that the read operation is complete.

The RdDataXfer (Read Data Transfer) signal is driven by bus slaves to tell the DMA controller that the final read data acknowledge of a line transfer will be active in the next clock cycle.

Figure 2:
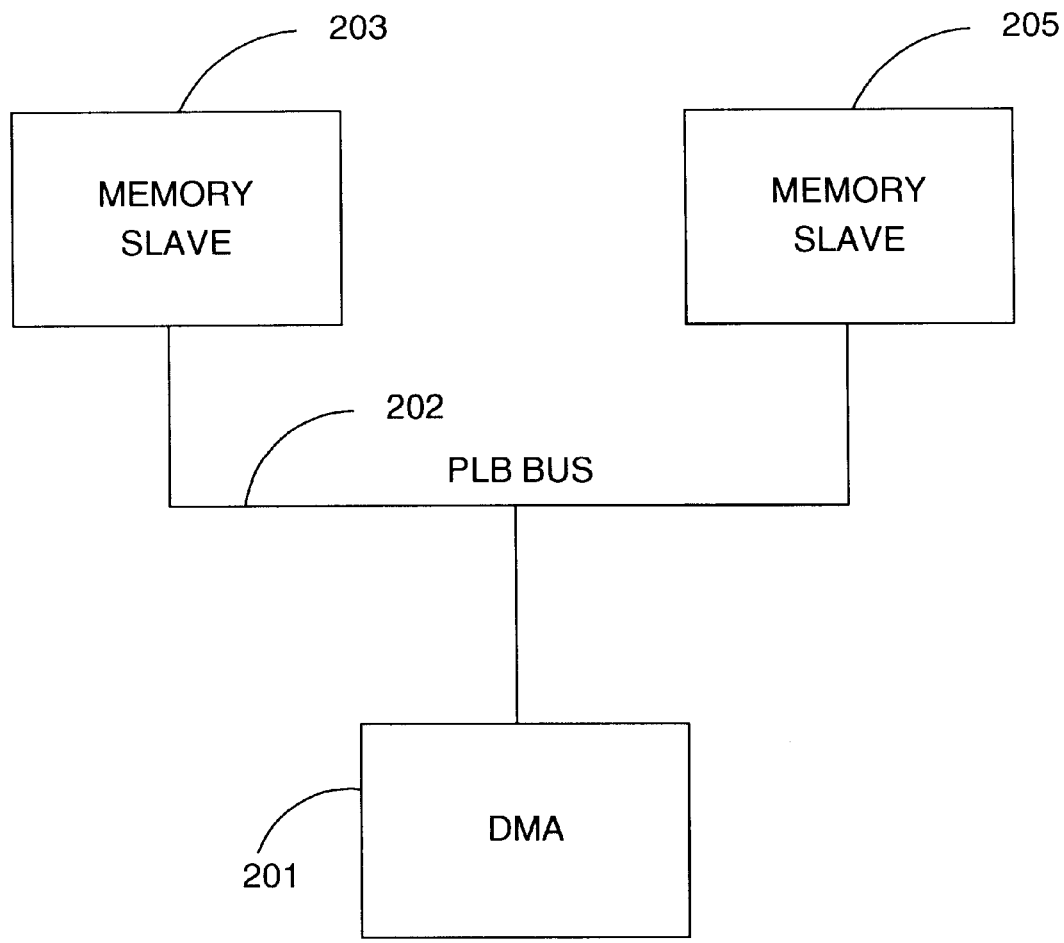
FIG. 2 is a simplified block diagram useful in explaining the operation of the key components of the system illustrated in FIG. 1 during an exemplary operational cycle.

In FIG. 2, there is shown a simplified block diagram useful in explaining the operation of the key components of the system illustrated in FIG. 1 during a DMA controller buffered memory to memory line transfer. The channel is configured and enabled for software initiated memory to memory transfer. The DMA controller 201 (corresponding, for example, to DMA controller 20 in FIG. 1) then performs a PLB DMA line read transfer cycle with the source address in a first memory slave control unit 203 (corresponding, for example, to memory slave bus controller 26 in FIG. 1). The first slave bus controller 203 acknowledges the read cycle and initiates memory read operations on its slave bus. The data just read is then driven onto the PLB bus 202 in whatever order the first slave controller 203 dictates. The read data is routed into the DMA controller buffer unit 21. The DMA controller 201 then performs a PLB line write transfer cycle with the destination address in a second memory slave controller unit 205 (corresponding, for example, to the OPB Bridge Slave controller 28 in FIG. 1). The second slave bus controller 205 acknowledges the line write transfer cycle and initiates the memory write operations on its slave bus to write the line of data from buffer 21 to a second memory slave 205.

Figure 3:
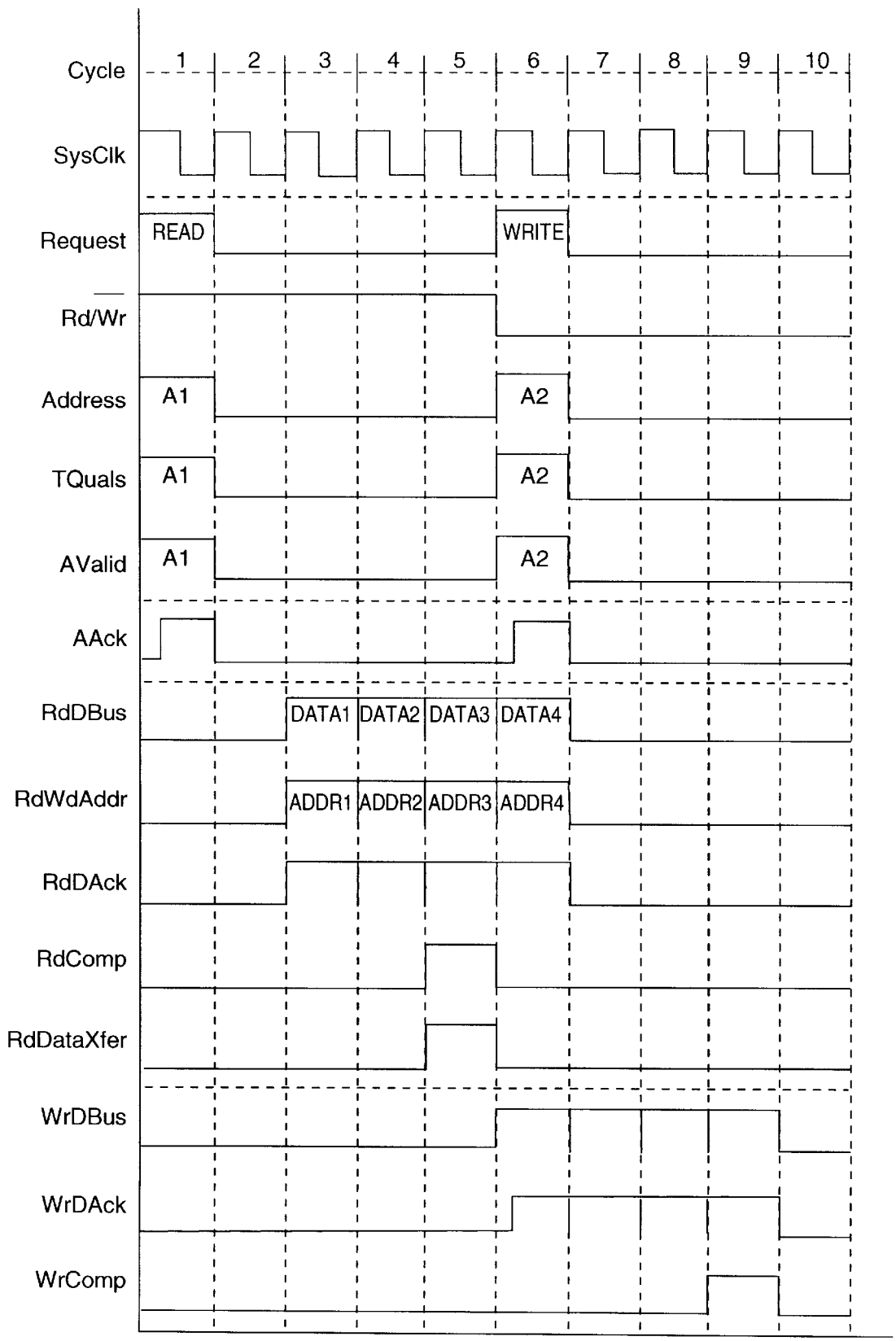
FIG. 3 is a simplified timing diagram illustrating various signal relationships during a typical operational cycle of the illustrated exemplary embodiment.

FIG. 3 illustrates a simplified timing diagram showing various signal relationships during an exemplary operational cycle in a memory to memory line transfer. The transfer begins by the DMA channel being configured and enabled for a software initiated memory to memory line transfer as hereinbefore noted. The DMA controller 20 responds by requesting (asserting the "Request" signal) a DMA line read transfer. This indicates to the slave bus controllers 26 and 28 that the read data transfer (RdDataXfer) sideband signal needs to be active at the appropriate time. The PLB slave bus controller 26 acknowledges the request by asserting address acknowledge (AAck). The slave bus controller 26 then performs memory read operations from the requested address. The controller 26 may provide the data in any addressing order in the line. For example, the requested line may contain words "A", "B", "C" and "D", and those words may be read out in the order of "B", "A", "D" and "C", with word "B" being read out first, word "A" being read out second, word "D" being read out third and word "C" being read out fourth. The value on the read word address bus (RdWdAddr) will indicate to the DMA controller 20 which word in the sequence for the requested line is being provided with a given read data acknowledge signal RdDAck. The DMA controller 20 will place the data words in the appropriate position in its internal line buffer 21 so that the line may be written out in the proper ascending sequential order even if the words arrived in an out of order condition as discussed above. The DMA controller 20 will also set a register bit called "First Word Loaded" when the first word, i.e. word A, of the line has been stored in its internal buffer. This may occur during any one of the read phases for example the first word "A" will have been loaded during the second phase (clock cycle 4 in FIG. 3) of the "B-A-D-C"example given above. The first word of the line that is being transferred corresponds to the data read from the actual line-aligned DMA address driven during the PLB read transfer. During the clock cycle prior to the last Read Data Acknowledge RdDAck, i.e. during clock cycle "5" in FIG. 3, the slave 203 asserts the read data transfer RdDataXfer signal to indicate to the DMA controller 20 that in the next clock cycle, the last word of line read, i.e. word "C" in the example, will be available on the read data bus.

The PLB slave bus controller 26 also asserts the read complete (RdComp) signal. The DMA controller 20 samples the RdDataXfer signal active and, since the first word in the line has been loaded, and the "first word loaded" bit has been set, the DMA controller begins a DMA line write transfer on the write bus in the next clock cycle. That write cycle overlaps with the last read data cycle on the read bus (clock cycle "6" in FIG. 3) thereby providing a significant transfer time saving and a corresponding increase in system performance. The DMA controller 20 receives AACK and WrDAck which indicate to the DMA controller 20 that the line write transfer request has been acknowledged by the slave controller 28 and that the first word of data has been latched. In the next clock cycle, the DMA controller 20 drives the next word of the line onto the write data bus and the slave again signals to the DMA that the slave has latched the data by asserting WrDAck. That write sequence continues for the third and fourth words of the line.

Thus, in the exemplary PLB architecture, the slave may provide the words of a line being transferred in any order. The master device receiving the line samples the RdWdAddr bus to determine which word it is receiving. During each read data phase of the line read cycle, the DMA controller samples the RdWdAddr bus to determine if the first word in the line has been received. The first word of the line corresponds to the actual address of the initial line read request. Although in the exemplary implementation, the DMA uses a four word, 16-byte per word line size, any line size may be used. If the DMA controller receives the first word in the first or second read data phase, the DMA will set a register bit ("First Word Loaded"). If the DMA receives the first word in the third data phase, e.g. clock cycle 5 in FIG. 3, and the read data transfer signal RdDataXfer is not asserted, the "First Word Loaded" bit will also be set. The slave controller will generate the RdDataXfer signal one clock cycle prior to providing the last data phase portion of the line. If the DMA detects the assertion of RdDataXfer and the "First Word Loaded" bit is set, the DMA will begin the line write cycle with the first word in the line in the next clock cycle.

The DMA must adhere to the PLB architecture in the present example which requires that the write be performed in contiguous order. If the DMA controller 20 detects the RdDataXfer signal in the same clock cycle of the read data phase of the first word in the line, it will also begin the line write cycle in the next clock cycle. The "First Word Loaded" bit need not be set under that condition. If the DMA controller does not receive the first word in the line prior to or during the clock cycle in which the RdDataXfer signal is asserted, the DMA controller will wait until the completion of the fourth read data phase of the transfer to begin the line write cycle. Under that condition, no overlap is possible, because the line write cannot begin until the first word is received. A particular slave may not support the RdDataXfer signal. If the DMA controller does not detect the RdDataXfer during the line read cycle signal, it must always wait until the completion of the fourth data phase of the line transfer. Using this methodology, the data transfer performance of DMA line transfers is increased, and it is possible, for example, to perform a four word line read and line write sequence in nine clock cycles. The decrease in the DMA bus utilization also increases the effective overall system bandwidth. It is also noted that either memory device 42 or memory device 44 could alternatively be memory mapped DMA slave peripherals and the disclosed methodology would operate in the same manner as hereinbefore explained.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for accomplishing successive read and write operations on a memory device, said memory device being arranged for storing lines of information with each of said lines of information including a plurality of words, said method comprising:

providing a line of stored information from a first location in said memory device to a read bus in response to a read request signal, said line of information being provided in successive reads with each of said successive reads comprising one of said plurality of words, said successive reads providing said plurality of words in a read out sequence different from a stored sequence in which said words are stored in said memory device;

generating a first condition signal after a first word of said stored line has been read;

detecting a second condition signal at a beginning of a penultimate read of said plurality of words in said line of stored information;

detecting a write request to said first location in said memory device prior to the detection of said second condition signal; and initiating a write operation to said first location in said memory device prior to a completion of said reads of said plurality of said words in said line of information if both of said first and second condition signals have been generated prior to a completion of said reads of said plurality of said words in said line of information.

2. The method as set forth in claim 1 wherein said lines of information comprise lines of stored data.

3. A method for transferring lines of information between a slave bus controller memory on a slave bus and a DMA controller, said method comprising:

asserting a line read transfer request by said DMA controller;

acknowledging said line read transfer request by said slave bus controller by asserting an address acknowledge signal;

performing a line read from a requested address by the slave bus controller, said line read being accomplished in a plurality of successive read phases, said successive read phases each providing a word of said line of information in a read out sequence, said read out sequence being different from a stored sequence in which said words are stored in said slave bus controller memory;

determining when a first word of said stored sequence of said line has been read out of said slave bus controller memory;

determining when a penultimate read phase has been initiated;

detecting a write request to said slave bus controller memory; and initiating a write operation to said slave bus controller memory prior to a completion of said read phases if both said first word has been read out and said penultimate read phase has been initiated.

4. The method as set forth in claim 3 wherein one word of said line of information is transferred during each data transfer phase.

5. The method as set forth in claim 4 wherein said line of information is read out from said slave bus controller memory to a buffer memory in said DMA controller.

6. The method as set forth in claim 3 wherein said line of information is read out from said slave bus controller memory to a buffer memory in said DMA controller.

7. A system for accomplishing successive read and write operations on a memory device, said system comprising:

a DMA controller;

a slave controller coupled to said DMA controller;

a read data bus connected between said DMA controller and said slave controller;

a memory device coupled to said slave controller, said memory device being arranged for storing lines of information with each of said lines of information including a plurality of words, said slave controller being selectively operable for providing a line of stored information from a first location in said memory device to said read bus in response to a read request signal, said line of information being provided in successive reads with each of said successive reads comprising one of said plurality of words, said successive reads providing said plurality of words in a read out sequence different from a stored sequence in which said words are stored in said memory device;

said DMA controller being operable for providing a first condition signal after a first word of said stored line has been read, said DMA controller being further operable for detecting a second condition signal at a beginning of a penultimate read of said plurality of words in said line of stored information;

said DMA controller being selectively operable for detecting a write request to said first location in said memory device prior to detecting said second condition signal, and, in response thereto, initiating a write operation to said first location in said memory device prior to a completion of said reads of said plurality of said words in said line of information if both of said first and second condition signals have been generated prior to a completion of said reads of said plurality of said words in said line of information.

8. The system as set forth in claim 7 wherein said lines of information comprise lines of stored data.

9. A system for transferring lines of information between a slave bus controller memory on a slave bus and a DMA controller, said system comprising:

a DMA controller, said DMA controller being selectively operable for generating a line read transfer request;

a slave bus controller coupled to said DMA controller, said slave bus controller being selectively operable for acknowledging said line read transfer request by asserting an address acknowledge signal;

said slave bus controller being further operable for performing a line read from a requested address, said line read being accomplished in a plurality of successive read phases, said successive read phases each providing a word of said line of information in a read out sequence, said read out sequence being different from a stored sequence in which said words are stored in said slave bus controller memory;

said DMA controller being operable for determining when a first word of said stored sequence of said line has been read out of said slave bus controller memory, said DMA controller being further operable for determining when a penultimate read phase has been initiated, and initiating a write operation to said slave bus controller memory prior to a completion of said read phases if a write request has been detected and both said first word has been read out and said penultimate read phase has been initiated.

10. The system as set forth in claim 9 wherein one word of said line of information is transferred during each data transfer phase.

11. The system as set forth in claim 10 wherein said DMA controller further includes a buffer memory, said line of information being read out from said slave bus controller memory to said buffer memory in said DMA controller.

12. The system as set forth in claim 9 wherein said DMA controller further includes a buffer memory, said line of information being read out from said slave bus controller memory to said buffer memory in said DMA controller.

* * * * *